(12) United States Patent
Zeyfang et al.

(10) Patent No.: US 7,517,485 B2
(45) Date of Patent: Apr. 14, 2009

(54) LIQUID VINYL INJECTION MOLDING METHOD AND APPARATUS

(75) Inventors: Frederick W. Zeyfang, Erie, PA (US); Timothy Jacob Chase, Machias, NY (US); John Charles Meidenbauer, Elma, NY (US)

(73) Assignee: Protective Industries, Inc., Buffalo, NY (US)

( * ) Notice: Subject to any disclaimer, the term of this patent is extended or adjusted under 35 U.S.C. 154(b) by 725 days.

(21) Appl. No.: 11/143,447

(22) Filed: Jun. 3, 2005

(65) Prior Publication Data
US 2007/0120295 A1     May 31, 2007

(51) Int. Cl.
*B29C 45/74* (2006.01)
(52) U.S. Cl. .............................. 264/328.15; 264/328.1
(58) Field of Classification Search .............. None
See application file for complete search history.

(56) References Cited

U.S. PATENT DOCUMENTS

| | | | |
|---|---|---|---|
| 2,058,552 A | 10/1936 | Becher et al. | |
| 3,005,237 A | 10/1961 | Anderson | |
| 4,600,150 A | 7/1986 | Zelasko | |
| 4,783,292 A | 11/1988 | Rogers | |
| 4,932,858 A * | 6/1990 | Gellert | 425/564 |
| 5,460,768 A * | 10/1995 | Akao et al. | 264/297.2 |
| 5,464,575 A * | 11/1995 | Jaffiol et al. | 264/443 |

* cited by examiner

*Primary Examiner*—Monica A Huson

(57) ABSTRACT

A method is provided for the formation of a molded article comprising the steps of: providing at least one liquid plastisol composition, providing an injection molding apparatus including an injection barrel, feeding the at least one liquid plastisol composition to the injection barrel, heating the at least one plastisol composition within the injection barrel to the fusion temperature of the plastisol, and injecting the at least one plastisol composition to the mold.

36 Claims, 1 Drawing Sheet

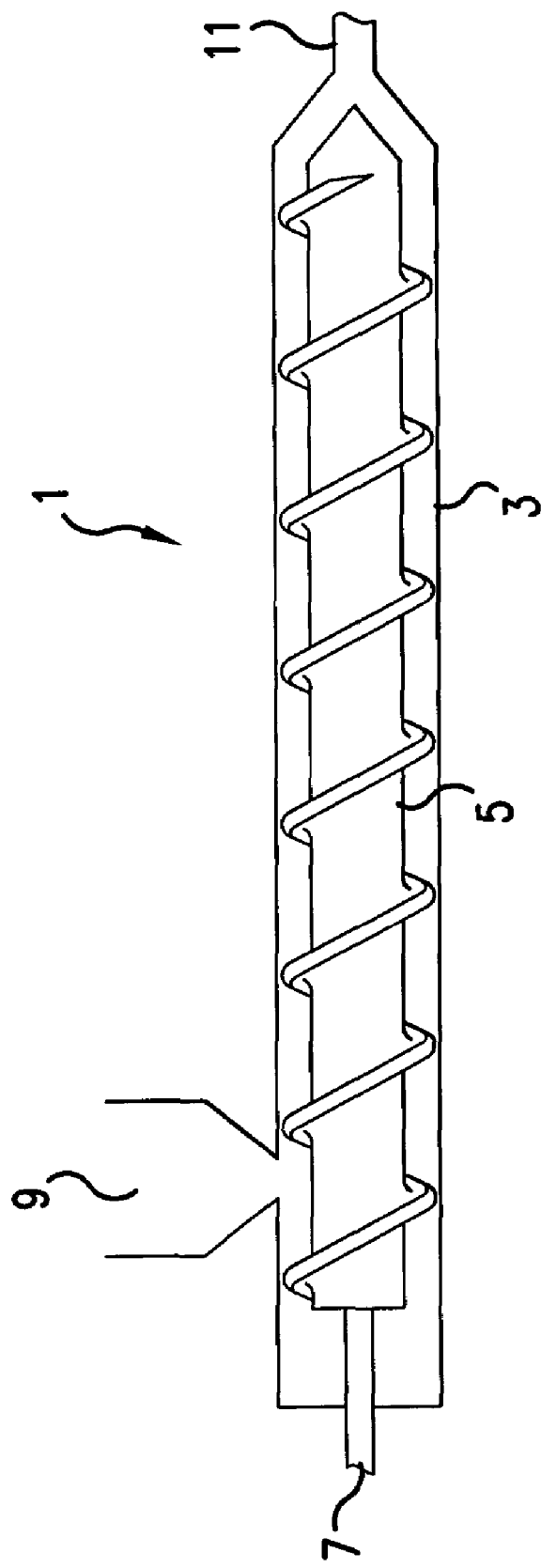

LIQUID VINYL INJECTION MOLDING METHOD AND APPARATUS

BACKGROUND OF THE PRESENT INVENTION

The present application is directed to a method for injection molding using liquid vinyl polymers.

Liquid vinyl polymers have commonly been employed in dip molding, casting, coating, and rotational molding processes in the form of plastisols. The process of dip molding has been used commercially for over sixty years to produce articles of various shapes and configurations. In a dip molding process, a heated mold form or mandrel is dipped into a plastisol bath whereupon a layer of gelled plastisol forms about the mandrel. The coated material is removed from the bath and the coated layer cured, resulting in a molded article corresponding in configuration to the configuration of the mandrel employed. For instance, when a cylindrical mandrel (or pin) is employed, a tubular article can be produced. Beverage containers, bicycle handles, gloves and tubular hose bend restrictors are but a few of the products that are presently produced by dip molding by use of varying types of mandrels.

The production of molded articles by dip molding presents some problems, such as providing a molded article having well-defined edges or end portions. For example, it is known that tubular articles frequently have end portions that curl around the end of the mandrel, with the undesirable result that the ends of the tube curl into the interior of the tube. Such a result can be overcome can cutting or trimming the offending edge. However, such an additional step is time consuming and constitutes an additional expense (both with respect to labor as well as wasted raw material).

Some attempts have been made to address such problems, as noted in U.S. Pat. Nos. 2,058,552 and 3,005,237, by way of example.

However, while the use of dip molding processes has produced relatively satisfactory products, and has done so for many years, the dip molding process has not been found to be satisfactory to the extent that well-defined products are desired to be produced.

Injection molding processes have been found to avoid such problems due to the greater spatial definition or geometry afforded by the interior of the mold. However, as the use of liquid plastisol-type materials has been limited to dip molding processes, the use of such materials in injection molding has heretofore not been believed appropriate, especially due to the use of a screw conveyor in injection molding. The screw conveyor has previously been thought generally best adapted for use with solid polymer particles which are fed to the injector housing to be melted and forced into the mold by the screw conveyor and which require significant work to undertake a phase change (solid to liquid) prior to being molded.

The use of a liquid polymer in injection molding is described by Rogers U.S. Pat. No. 4,783,292. The Rogers patent teaches the addition of pressurized gas bubbles into a pre-heated liquid polymer, with the liquid polymer subsequently being forced into a mold cavity whereby the bubbles expand to form a foamed plastic article.

Zelasko U.S. Pat. No. 4,600,150 discloses a spraying system wherein a material to be sprayed is heated prior to being fed to a screw conveyor means, whereupon the heated material is passed to a spray means.

The use of injection molding is also known for LIM silicone (Liquid Injection Molding Silicone) which is a two part liquid silicone (thermoset) material that uses a pumping system and static mixer. The components mix prior to being introduced into the injection barrel and the liquid maintained at room temperature until being heated in the mold where the silicone material is cured.

However, the prior art fails to satisfactorily address the disadvantages noted above.

OBJECTS AND SUMMARY OF THE INVENTION

It is accordingly an object of the present invention is to provide a method for the production of molded products using plastisol materials in order to yield molded products of greater consistency and predictability in form than is presently the case for dip molding process.

In accordance with the present invention, there is thus provided a method of injection molding comprising the steps of:

providing a plastisol composition;

feeding said plastisol composition to a screw conveyor for an injection mold;

causing said plastisol to be transported along said screw conveyor while heating said plastisol to an elevated temperature in said screw conveyor;

feeding said heated plastisol to said injection mold; and forming a molded product in said injection mold from said heated plastisol.

BRIEF DESCRIPTION OF THE DRAWINGS

The FIGURE is a schematic view of an injection molding apparatus that can be used to practice the invention.

DETAILED DESCRIPTION OF THE INVENTION

The present invention is directed to a method of injection molding by use of a plastisol composition.

Plastisol compositions are well known to those skilled in the art. The composition of the plastisol is not critical, as a variety of plastisol compositions are conventionally employed in the dip molding art.

The plastisol is generally prepared by dispersing particles of resin or polymer particles in a liquid plasticizer. The particles are of size generally employed for emulsions or suspensions. The particles may be admixed with the plasticizer at room temperature, whereupon the particles become plasticized within the composition.

A polyvinyl chloride (either a homo- or copolymer of vinyl chloride) has been frequently used to form a plastisol. Acrylic resins have also been suggested for use to form the plastisol. An exemplary acrylic resin comprises a polymer comprised of an alkyl acrylate or methacrylate monomer. An acrylic resin used to form the plastisol may contain one or more functional groups to modify the properties of the plastisol. Such functional groups include but are not limited to carboxyl, hydroxyl, epoxy, methylol, etc. The plasticizer may further include a cross-linking agent which is functionally compatible with one or more of the functional groups to permit cross-linking to occur during the molding process. The selection of a suitable plastisol composition for use in the present invention is well within the skill of the practitioner in the art.

Any suitable plasticizer may be employed which is compatible with the resin component.

Suitable plasticizers for use with an acrylic resin include but are not limited to esters of aromatic dibasic acids or polybasic acids such as phthalic acid; esters of aliphatic dibasic acid or polybasic acid; esters of phosphoric acid, esters of hydroxy polyhydric carboxylic acid; esters of polyhydric alcohol; or expoylated oil. branched phthalate plasticizers, Suitable plasticizers for use with a polyvinyl chloride resin include but are not limited to phthalate plasticizers such as diisoheptyl phthalate, diisononyl phthalate, dihexyl phthalate, butyloctyl phthalate, butylbenzyl phthalate, dioctyl phthalate, disooctyl phthalate, dicapryl phthalate, dioctyltere phthalate, and diisodecyl phthalate, linear phthalates, and mixtures thereof.

Suitable plasticizers are known in the art as evidenced by the disclosures of U.S. Pat. Nos. 5,441,994 and 6,004,641, these patents being merely exemplary of multiple teachings in the art regarding suitable plasticizers for use in plastisols.

The relative proportions of plasticizer and resin may vary within wide proportions, depending upon the desired physical properties of the molded product. For instance, if it is desired to provide a product that possesses significant flexibility (such as in a polyvinyl chloride fishing worm), then the resin might be present in an amount of 10-15 wt. %, with the plasticizer being present in an amount of 80-85 wt. %, with 1-2 wt. % being heat stabilizers, additive(s), and or colorants. If it is desired to produce a molded product having greater structural rigidity (such as in a polyvinyl chloride plumbing pipe), then the resin might be present in an amount of at least 95 wt. %, with the plasticizer being present in an amount of 1-2 wt. %, with the balance being additive(s) materials.

With the above in mind, the plasticizer may be present in the plastisol within a range of about 1 to 90 wt. %, and the resin may be present in the plastisol material in an amount within the range of about 10 to 99 wt. %. As noted above, one of ordinary skill in the art can readily determine which ratio of plasticizer/resin may be appropriate for a particular molded product. However, another advantage of the present invention is that plasticizer/resin ratios may be used that might otherwise not be readily adaptable to use in a dip molding process—for example, low ratios of plasticizer/resin. With the above in mind, a typical plastisol composition may comprise 58 wt. % of polyvinyl chloride powder of 1 micron size, 40 wt. % plasticizer, and 2 wt. % additive(s) material. The selection of the size of the polymer particle used to form the plastisol is well within the skill of the routineer in the art.

If desired, the plastisol composition may include additional components such as fillers (e.g., calcium carbonate, silica), pigments, etc. to provide post-molding visual effects or to modify the molding properties of the composition.

The injection molding method of the present invention may employ a conventional injection molding apparatus comprised of an injection mold and a screw conveyor means having heat transfer means incorporated therewith to provide heat to the plastisol.

One example of an injection molding apparatus which may be used in connection with the present invention is described in connection with the FIGURE.

The injection mold apparatus 1 comprises injection barrel 3, screw conveyor (reciprocating screw) 5 having axle 7 connected to drive and injection means (not shown), at least one inlet port (or feed throat) 9 and exit port (or nozzle) 11. An O-ring (not shown) is preferably positioned at the end of the injection barrel upstream of the inlet port to inhibit passage of the plastisol from the injection barrel.

The injection barrel is connected to an injection mold (not shown) into which the heated plastisol is injected for purposes of molding. The injection mold is of conventional design and may be operatively connected to the discharge end of the injection barrel. One of ordinary skill in the art can readily determine what type of injection mold apparatus may be employed in the present invention.

Of course, the specific design of the injection molding apparatus is not critical to practice of the present invention. As such, the plastisol feed material may be used with advantage with a variety of injection molding systems.

The apparatus will employ one or more delivery systems including gravity or feed pumps (e.g., tube pumps) to provide the necessary materials to inlet port 9 for admixing in the screw conveyor. At least one delivery system (not shown) will deliver plastisol material to the inlet port. It may be advantageous to have multiple delivery systems and/or multiple inlet ports to permit delivery of different plastisol compositions together with various additives to the screw conveyor, either simultaneously or separately.

Simultaneous delivery by means of, for example, a delivery manifold permits pre-selection or modification of the physical properties of the molded product by mixing/matching different materials. It is also desirable to provide different delivery systems for inert components (liquid additives, plasticizers, coloring agents, fillers, UV stabilizers, anti-fungal agents, lubricants, processing aids, etc.). Reactive components such as cross-linking agents are desirably added separately from the plastisol (such as by separate inlet port) to avoid premature reaction with the plastisol material. For instance, using such a multiple feed system, it is possible to feed to the injection barrel for mixing therein separate feed streams of plastisol, plasticizer, liquid additives, and colorants either via the same or separate inlet ports. This permits the ultimate molding composition to be easily and efficiently modified during the injection molding process.

Of course, control means may be provided which enables the operator to monitor and/or control delivery of components to the screw conveyor from the separate delivery systems by, for example, a manifold which collects the respective feed streams and delivers them collectively to the inlet port. As discussed above, it is also possible for the housing to have multiple inlet ports, with the only limitation being that such inlet ports are positioned to enable the respective feed streams to become sufficiently admixed prior to being fed to the mold cavity.

It has been found advantageous to employ a screw conveyor which has both a lower compression ratio and shallower flight depth in connection with the injection molding of plastisol material than would conventionally be employed for an injection molding screw. One reason for use of such a screw construction is that the plastisol material, being liquid in character, requires less work that would be required by solid resin pellets for heating, melting and mixing. Also, since the plastisol is not a solid material as are the pellets, less work is required to transport the material through the bore of the screw conveyor toward the mold. The shallow flight depth also serves to maximize contact of the plastisol material with the surface of the screw conveyor, thus enhancing the transfer of heat to the material.

The compression ratio of the screw conveyor generally ranges from About 3:1 or less, preferably from 1.1:1 to 3:1, and most preferably 1.5:1 to 2:1. A conventional injection molding process typically uses a 3:1 compression ratio. By contrast, the screw conveyor compression ratio for a liquid plastistol injection for an injection mold apparatus may be as low as 1.5:1 with advantage. The compression ratio is the difference in the screw root diameter from the feed section of the screw conveyor (I.e., near the feed port) to the opposite end (i.e., near the exit port).

In contrast to conventional injection molding processes which employ solid pellets at ambient temperature which must be heated to a temperature above the melting temperature of the pellets, in the present invention the plastisol need not be heated beyond ambient temperature prior to being fed to the screw conveyor. This reduces the number of times that the plastisol must be subjected to elevated temperatures, thus reducing the potential heat history of the material and requires less energy to process the polymer. Advantageously, the heat of fusion of the plastisol is not changed.

As the plastisol is preferably not preheated prior to being fed to the screw conveyor, it is heated as it flows through the screw conveyor from the feed port to the exit port. Suitable heating means include those conventionally employed in the prior art. For example, the injection barrel may be heated by resistance bands (heater bands) which are wrapped around the barrel.

The plastisol is heated within the screw conveyor to a temperature of at least the fusion temperature of the plastisol so that the plastisol will fuse upon being cooled in the mold. Typically, the plastisol will be heated to a temperature within the range of about 150 to about 210° C., preferably about 180° C., while traversing the screw conveyor. A fusion temperature of about 175° C. is frequently employed with polyvinyl chloride-based plastisol material. It is an important advantage of the use of the plastisol material in the injection molding process of the present invention that it is not necessary to undertake a phase change (e.g., solid to liquid) for the injection molded material, as the material is already in a flowable form. This results in reduced energy requirements, reduced shear effect on the material, and no previous heat history for the material.

Once injected into the mold at the requisite temperature of fusion, the plastisol is permitted to cool, whereupon it cures and forms the desired molded object. The molded object may then be removed from the mold by separation of the respective mold halves.

What is claimed is:

1. A method for the formation of a molded article, the method comprising the steps of:
   providing at least one liquid plastisol composition, wherein said at least one plastisol composition is comprised of particles of a resin or polymer dispersed in a liquid plasticizer,
   providing an injection molding apparatus including an injection barrel and an injection mold,
   feeding said at least one liquid plastisol composition to said injection barrel at a temperature below the fusion temperature of said plastisol,
   heating said at least one plastisol composition within said injection barrel to at least the fusion temperature of said plastisol,
   injecting at a temperature of at least the fusion temperature thereof said at least one plastisol composition from said injection barrel into said injection mold, and
   permitting said plastisol to cool within said mold below said fusion temperature to form a molded article.

2. The method of claim 1, wherein more than one plastisol composition is fed into said injection barrel.

3. The method of claim 1, wherein said at least one plastisol composition is heated within said injection barrel to a temperature within the range of 150 to 210° C.

4. The method of claim 3, wherein said at least one plastisol composition is heated within the injection barrel to a temperature of about 180° C.

5. The method of claim 1, wherein said at least one plastisol composition is comprised of an acrylic resin.

6. The method of claim 1, wherein said at least one plastisol composition is comprised of a polyvinyl chloride resin.

7. The method of claim 1, comprising feeding a cross-linking agent to said injection barrel for admixture with said at least one plastisol composition.

8. The method of claim 1, wherein said at least one plastisol composition is comprised of from about 10 to 15 wt. % of resin or polymer particles.

9. The method of claim 1, wherein said at least one plastisol composition is comprised of from 10 to 95 wt. % of resin or polymer particles.

10. The method of claim 1, wherein said at least one plastisol is comprised of from about 40 to 90 wt. % plasticizer.

11. The method of claim 1, comprising combining at least one additional component with said at least one plastisol composition in said injection barrel selected from the group consisting of fillers, pigments, liquid plasticizers, colorants, UV stabilizers, anti-fungal agents, lubricants, cross-linking agents, and processing aids.

12. The method of claim 1, comprising feeding said at least one liquid plastisol from said injection barrel to said injection mold by means of a screw conveyor.

13. The method of claim 12, wherein said screw conveyor has a compression ratio ranging from 1.1:1 to 3:1.

14. The method of claim 13, wherein said compression ratio ranges from 1.5:1 to 2:1.

15. The method of claim 12, wherein said compression ratio is 3:1 or less.

16. The method of claim 1, comprising feeding multiple plastisol compositions to said injection barrel by use of a feed manifold connected to separate plastisol feed streams.

17. The method of claim 1, comprising feeding multiple plastisol compositions to said injection barrel from different feed means.

18. The method of claim 1, comprising feeding multiple plastisol compositions to said injection barrel using different inlet ports.

19. The method of claim 1, comprising feeding said at least one liquid plastisol composition into said injection barrel at ambient temperature.

20. The method of claim 19, comprising feeding said at least one liquid plastisol composition from said injection barrel to said injection mold by means of a screw conveyor in said injection barrel.

21. The method of claim 20, wherein said screw conveyor has a compression ratio of 3:1 or less.

22. The method of claim 21, wherein said compression ratio ranges from 1.1:1 to 3:1.

23. The method of claim 22, wherein said compression ratio ranges from 1.5:1 to 2:1.

24. The method of claim 19, wherein said at least one plastisol composition is heated within said injection barrel to a temperature within the range of 150 to 210° C.

25. The method of claim 20, comprising combining at least one additional component with said at least one plastisol composition in a feed manifold prior to being fed to said injection barrel, said at least one additional component being selected from the group consisting of fillers, pigments, liquid plasticizers, colorants, UV stabilizers, anti-fungal agents, lubricants, cross-linking agents, and processing aids.

26. The method of claim 20, wherein said at least one plastisol composition is comprised of an acrylic resin.

27. The method of claim 20, wherein said at least one plastisol composition is comprised of a polyvinyl chloride resin.

28. The method of claim 20, comprising feeding a crosslinking agent to said injection barrel for admixture with said at least one plastisol composition.

29. The method of claim 20, wherein said at least one plastisol composition is comprised of from about 10 to 15 wt. % of resin or polymer particles.

30. The method of claim 20, wherein said at least one plastisol composition is comprised of from 10 to 95 wt. % of resin or polymer particles.

31. The method of claim 20, wherein said at least one plastisol is comprised of from about 40 to 90 wt. % plasticizer.

32. The method of claim 20, wherein said at least one plastisol composition is heated within said injection barrel to a temperature within the range of 150 to 210° C.

33. The method of claim 20, comprising feeding multiple plastisol compositions to said injection barrel by use of a feed manifold connected to separate plastisol feed streams.

34. The method of claim 20, comprising feeding multiple plastisol compositions to said injection barrel from different feed means.

35. The method of claim 20, comprising feeding multiple plastisol compositions to said injection barrel using different inlet ports.

36. The method of claim 20, comprising feeding said at least one liquid feed plastisol into said injection barrel at ambient temperature.

* * * * *